(12) United States Patent
Krueger et al.

(10) Patent No.: US 8,152,241 B2
(45) Date of Patent: Apr. 10, 2012

(54) ADJUSTMENT FITTING

(75) Inventors: Frieder Krueger, Coburg (DE); André Blinzler, Grub am Forst (DE); Stephanie Hartleb, Weidhausen (DE); Juergen Siller, Roedental (DE); Matthias Weiss, Roedental (DE); Michael Zellmann, Bischberg (DE); Volker Moeller, Coburg (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 0 days.

(21) Appl. No.: 12/966,935

(22) Filed: Dec. 13, 2010

(65) Prior Publication Data
US 2011/0140493 A1 Jun. 16, 2011

Related U.S. Application Data

(63) Continuation of application No. PCT/EP2009/004086, filed on Jun. 6, 2009.

(30) Foreign Application Priority Data

Jun. 13, 2008 (DE) .......................... 10 2008 028 102
Jun. 13, 2008 (DE) .......................... 10 2008 028 103

(51) Int. Cl.
*B60N 2/02* (2006.01)
(52) U.S. Cl. ................. 297/367 R; 297/362; 297/362.12
(58) Field of Classification Search .................. 297/362, 297/362.12, 367 R, 369
See application file for complete search history.

(56) References Cited

U.S. PATENT DOCUMENTS

| | | | | |
|---|---|---|---|---|
| 4,322,112 | A | 3/1982 | Berghaus et al. | |
| 4,708,392 | A * | 11/1987 | Werner et al. | 297/362 |
| 5,531,504 | A * | 7/1996 | Schmale et al. | 297/362 |
| 6,799,806 | B2 | 10/2004 | Eppert et al. | |
| 7,390,061 | B2 * | 6/2008 | Lange | 297/362 |
| 7,497,520 | B2 * | 3/2009 | Assmann | 297/367 R |
| 7,753,450 | B2 * | 7/2010 | Eppert et al. | 297/362 |

FOREIGN PATENT DOCUMENTS

| | | |
|---|---|---|
| DE | 2834529 A1 | 2/1980 |
| DE | 31 30 315 A1 | 2/1983 |
| DE | 100 21 403 A1 | 11/2001 |

(Continued)

*Primary Examiner* — Laurie Cranmer
(74) *Attorney, Agent, or Firm* — Muncy, Geissler, Olds & Lowe, PLLC

(57) ABSTRACT

An adjustment fitting, in particular for a vehicle seat, includes a first fitting part and a second fitting part that can be rotationally adjusted relative to the first fitting part about an axis of rotation. An external gear, which has internal teeth and into which an internal gear that is associated with the second fitting part and has external teeth is inserted eccentrically to the axis of rotation like an eccentric gear, is associated with the first fitting part. The internal gear forms an eccentric receiving space towards the axis of rotation. The adjustment fitting further comprises an eccentric member that is rotatably inserted into the eccentric receiving space, and a drive shaft for driving the eccentric member. The external gear is designed as a ring gear that has a bottom and an external wall which axially extends beyond the internal teeth and embraces the external teeth of the internal gear by means of a radially inward-oriented collar. In addition, the internal gear comprises an internal wall which axially extends beyond the external teeth and axially penetrates the collar. The fitting parts are thus securely fastened in the axial direction while access is made easy, especially for mounting the adjustment fitting on a vehicle seat or a seat adapter.

15 Claims, 4 Drawing Sheets

FOREIGN PATENT DOCUMENTS

| | | |
|---|---|---|
| DE | 101 05 282 A1 | 8/2002 |
| DE | 10 2007 035 138 A1 | 4/2008 |
| EP | 1 676 503 A1 | 7/2006 |
| FR | 2 432 951 A1 | 3/1980 |
| FR | 2 510 374 A1 | 2/1983 |
| WO | WO 01/83259 A1 | 11/2001 |
| WO | WO 2009/033572 | 3/2009 |

* cited by examiner

ADJUSTMENT FITTING

This nonprovisional application is a continuation of International Application No. PCT/EP2009/004086, which was filed on Jun. 6, 2009, and which claims priority to German Patent Application Nos. DE 10 2008 028 102.6, which was filed in Germany on Jun. 13, 2008, and to DE 10 2008 028 103.4, which was filed in Germany on Jun. 13, 2008; and which are all herein incorporated by reference.

BACKGROUND OF THE INVENTION

1. Field of the Invention

The invention relates to an adjustment fitting, in particular for a motor vehicle seat, having a first fitting part, having a second fitting part that is rotationally adjustable relative to the first fitting part about an axis of rotation, wherein the first fitting part has associated with it an outer wheel with internal teeth, in which wheel is inserted eccentrically to the axis of rotation, in the manner of a wobble mechanism, an inner wheel with external teeth that is associated with the second fitting part, and wherein the inner wheel forms a receiving space that is eccentric to the axis of rotation, having an eccentric cam rotatably inserted in the eccentric receiving space, and having a drive shaft for driving the eccentric cam.

2. Description of the Background Art

An adjustment fitting of this nature is known, for example, from DE 100 21 403 C2, DE 31 30 315 C2 and DE 28 34 529 C2, which corresponds to U.S. Pat. No. 4,322,112. In these fittings, the first fitting part and the second fitting part are connected in the manner of a wobble mechanism, wherein the inner wheel rolls with its external teeth along the internal teeth of the outer wheel with a wobbling motion when the eccentric cam is driven. The number of teeth in the external teeth is smaller than the number of teeth in the internal teeth. One full rotation of the eccentric cam results in a rotation of the inner wheel relative to the outer wheel by the difference in tooth count. An adjustment fitting with wobble mechanism has become established in the automotive industry for adjusting the backrest relative to the seat base of a motor vehicle seat. A wobble mechanism can be implemented with relatively few mechanical parts, and permits flat construction together with a transmission ratio desirable for adjustment.

In the final assembled state, the fitting parts, or the inner and outer wheel of such an adjustment fitting, are held together in the axial direction. An extremely wide variety of retaining means are known from the prior art for this purpose. If the axial play between the fitting parts is too great, the result is undesirable rattling noises, which the vehicle occupant may potentially find worrisome, or at the very least perceive as unpleasant. On the other hand, if the axial play between the fitting parts is too small, an unnecessarily high frictional force has to be overcome in order to adjust the fitting.

Known from the aforementioned DE 100 21 403 C2 for holding the two fitting parts together axially is a retention ring overlapping the two fitting parts that is attached in a rotationally fixed manner to at least one of the fitting parts by means of a polygonal interlock.

According to DE 10 105 282 B4, which corresponds to U.S. Pat. No. 6,799,806, the fitting parts of an adjustment fitting are held together axially by a retaining ring, wherein a fitting part is pressed into the retaining ring. This is intended to permit easier assembly. It is additionally proposed therein to design the retaining ring with an internal step, with the fitting part being pressed in up to said step.

From DE 31 30 315 C2, it is known to use a plate washer, which is permanently attached to one fitting part, for axially holding together the two fitting parts of an adjustment fitting. In this solution, the edge of the washer constitutes internal teeth that mesh with overhanging external teeth of the inner wheel. To hold the fitting parts together axially, the plate washer is interlocked with a retaining element that is pressed into slots in the other fitting part and is attached to this fitting part in a position with no play.

Finally, DE 28 34 529 C2 discloses a bearing plate holding the fitting parts of an adjustment fitting together axially, which has lateral bent portions that laterally overlap the two fitting parts. During assembly, the fitting parts are pressed together with no play, and the outer fitting part is permanently attached to the lateral bent portions in this position.

SUMMARY OF THE INVENTION

It is an object of the invention is to provide an adjustment fitting in which the fitting parts are held together as securely as possible and which permits easy installation in a vehicle seat.

According thereto, provision is made for the outer wheel to be designed as a ring gear with a floor and with an outer wall that is extended in the axial direction past the internal teeth and that overlaps the external teeth of the inner wheel with a radially inward facing collar, wherein the inner wheel includes an inner wall that is extended in the axial direction past the external teeth and that passes through the collar in the axial direction.

In this way, the inner wheel is held securely on the outer wheel in the axial direction between the floor and the radially inward facing collar. As a result of the extended inner wall of the inner wheel, easy installation of an adapter is possible for attachment to a specific vehicle seat. The inner wheel is accessible from outside by means of the extended inner wall. An appropriate adapter can be attached by means of welding, for example, advantageously by means of laser welding. Alternatively, the inner wheel can be attached via its inner wall to the second fitting part or to an adapter by means of adhesives or soldering. In this regard, the inner wheel is preferably associated with the second fitting part via the inner wall. In addition, the extended inner wall allows axial displacement of the relevant adapter, which can be made in different thicknesses, up until it is fastened, by which means the number of variants can be reduced.

In an embodiment of the adjustment fitting, the ring gear can be divided along the internal teeth and is composed of a first and a second shell, wherein the second shell overlaps the external teeth of the inner wheel as a collar. A compact design of the adjustment fitting is made possible in this way. The internal teeth of the inner wheel are held securely between the two shells of the outer wheel. Easy installation is possible as a result of the two-part design.

In an alternative embodiment, the collar is composed of a retaining element that can be pushed axially in the outer wall toward the inner wheel, which retaining element is attached to the outer wall, wherein the inner wheel is supported against the floor of the ring gear.

During assembly, the inner wheel is pushed axially into the ring gear until the floor is reached, and the retaining element is then guided into the interior of the ring gear after it, so that the inner wheel is supported between the floor and the retaining element. Because of the axial displaceability of the retaining element, the axial play of the inner wheel with respect to the outer wheel can be adjusted to zero play. Once the desired position of the retaining element relative to the floor of the outer wheel has been reached, the retaining element is secured to the outer wall. In particular, this can be accomplished by means of a suitable welding technique. In advantageous manner, the securing of the retaining element in the outer wheel is accomplished by means of laser welding. This can be done by means of a circumferential fillet weld. In particular, a connection by means of what is called a "square butt weld," which is produced by laser welding, is present. Naturally, fastening by means of adhesives or soldering is also possible. The joining of the retaining element to the outer wall of the outer wheel can be carried out at discrete points or circumferentially. In other words, the ring gear has internal teeth that are axially recessed relative to the outer wall. Preferably, the ring gear itself is likewise laser welded to the first fitting part.

In this design, the setting of the desired position of the retaining element relative to the floor of the outer wheel can be controlled either by force or by distance. In the case of a setting controlled by force, manufacturing tolerances in the axial height of the inner wheel are compensated. On the other hand, distance-controlled establishment of the desired position allows for variants having alterable strength through variation of the axial thickness of the inner wheel with otherwise identical components. For example, if the thickness of the inner wheel is increased in the case of distance-controlled establishment of the position of the retaining element, this results in an adjustment fitting with increased strength.

It is not necessary for the floor to be designed to have complete area coverage. In principle, it is sufficient to design the floor as a support for the inner ring. A suitably designed edge or partial surface is sufficient for this purpose. Preferably, however, the floor essentially closes off the interior space of the ring gear. In this way, the ring gear can simultaneously form an outer boundary of the adjustment fitting. The interior space, and thus the wobble mechanism, is protected from dirt and the like.

Nor is it necessary to the invention that the axial width of the internal teeth match the axial width of the external teeth. For example, the entire inner wheel can have a reduced thickness as compared to the thickness of the external teeth and can be supported against the floor past the external teeth by means of angled sections of the collar or of the retaining element. In contrast, it is also possible for the external teeth to have an increased axial width as compared to the internal teeth, and for the inner wheel to be supported on the collar by means of the radially projecting external teeth. In this design, it is possible in particular for the external teeth to be located on a sort of flange by means of which the inner wheel is supported against the collar.

There are in principle no restrictions regarding the outer contour of the outer wall and inner wall. Both the outer and inner walls can be axially extended in a prismatic manner to form respective hypothetical or actual base surfaces. In particular, polygonal circumferential contours are also possible.

In an embodiment, the outer wall of the ring gear and the inner wall of the inner wheel are each designed as a cylinder wall. The rotationally symmetrical design of the components permits simplified manufacture. In addition, it is not necessary to ensure a specific rotational position of the components relative to one another when joining them.

The retaining element can be designed as a retaining ring or retaining washer that surrounds the inner wheel or its external teeth at least at the edge. As a result of the rotational symmetry, this results in a secure and stable support of the inner wheel in the outer wheel.

A central elongated collar can be formed on the floor of the ring gear, so that the eccentric receiving space is formed between the elongated collar and the inner wheel. The drive shaft for the adjustment fitting, for example, is securely guided in such an elongated collar. On the other hand, such an elongated collar offers the possibility of providing a plain bushing for supporting the eccentric cam.

The eccentric cam in the eccentric receiving space is supported between an inner plain bushing and an outer plain bushing in this design. Such support by means of plain bushings reduces the friction of the rotating eccentric cam with regard to the outer and inner wheels.

An eccentric cam providing a rigid or variable overall eccentricity can be placed in the eccentric receiving space. Various designs are known from the prior art for forming a variable overall eccentricity, in particular. In an especially advantageous embodiment, two mutually rotatable eccentric cam parts forming a variable overall eccentricity are placed in the receiving space and are preloaded against one another to form a maximum overall eccentricity, wherein, furthermore, a carrier that is attached to the drive shaft in a rotationally fixed manner is provided which, when driven, acts on the eccentric cam parts in opposition to the preloading. When the drive shaft is not actuated, the eccentric cam parts are preloaded to form the maximum overall eccentricity. In this position, the eccentric cam presses the inner wheel against the outer wheel essentially free of play, so that undesired motion of the two fitting parts relative to one another is hindered. When the drive shaft is moved, the eccentric cam parts are rotated in opposition to the preloading, by which means the overall eccentricity is reduced. Play arises between the inner wheel and outer wheel, so that adjustment of the fitting parts relative to one another is possible.

A continuous bearing journal is provided for supporting the components of the adjustment fitting, on which bearing journal the outer wheel is supported, in particular by means of the aforementioned central elongated collar.

The first fitting part, in particular the ring gear, can be attached, in particular welded, to a backrest adapter, and for the second fitting part, in particular the inner wheel, to be attached, in particular welded, to a seat adapter. Since the adjustment fitting as such has no specific components for a particular vehicle seat, it is very versatile in its use. The adjustment fitting can be used for vehicle seats of different model variants by attaching a seat adapter or backrest adapter. In the configurations shown, the inner wheel remains fixed to the seat, while the outer wheel, including the drive shaft, wobbles during adjustment. The attached seatback moves in the same direction as the drive shaft.

In another embodiment of the adjustment fitting, the external teeth of the inner wall of the inner wheel can be covered by a circumferential ring. As a result of the ring, which to a certain extent is placed on the external teeth, secure support of the radially inward-facing collar of the outer wheel is made possible.

Heretofore, the outer wheel and inner wheel of an adjustment fitting equipped with a wobble mechanism have been implemented as precision stampings that are appropriately formed. Inner and outer wheels fabricated in this manner have an approximately constant material thickness at all points, corresponding essentially to the original sheet thickness. However, a constant material thickness is not suitable for the actual loads. Such fabrication also does not permit precisely toleranced positioning of different geometries on the component, as for example the location of an elongated wall relative to teeth.

However, the disadvantages of the prior art manufacturing methods for producing an outer or inner wheel for a wobble mechanism can be overcome if the inner or outer wheel in question is fabricated as a cold extrusion part. Extrusion is a process of massive forming that produces both hollow and solid bodies in a single-stage or multi-stage fabrication process. In principle, in this process the material being processed, in particular metal, is caused to flow under the influence of high pressure. In this process, a die presses the blank workpiece through a tool opening of reduced cross-section, a female mold, that imparts shape. The forming itself generally takes place at room temperature, so that the process is referred to as cold extrusion. In this way, high dimensional accuracy and high surface quality are achieved.

The advantage of using cold extrusion for fabricating the inner wheel and/or the outer wheel for an adjustment fitting lies in the possibility of strength-optimized designs, which may provide weight advantages under some circumstances. In addition, cost advantages can be achieved through savings in material. Moreover, tighter tolerances in the teeth and in coaxiality can be achieved through the use of cold extrusion, improving the homogeneity of actuation of the adjustment fitting. Since an adjustment fitting is a mass-produced part, cost advantages are achieved by the means that only one tool is required for fabrication.

For the aforementioned inner wheel with elongated inner wall, cold extrusion permits, in particular, simplified creation of a geometry in which the external teeth are covered by a circumferential ring. By this means, the teeth are circumferentially bonded, so that strength is increased for the same assembled volume. A corresponding geometry cannot be achieved with other cold forming processes. At most, machining comes into consideration.

For an outer wheel, which in the present case is implemented as a ring gear, the use of cold extrusion allows reinforcement of the material in especially stressed regions. This can be provided in the area of the inner elongated collar or in the vicinity of the teeth, for example.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
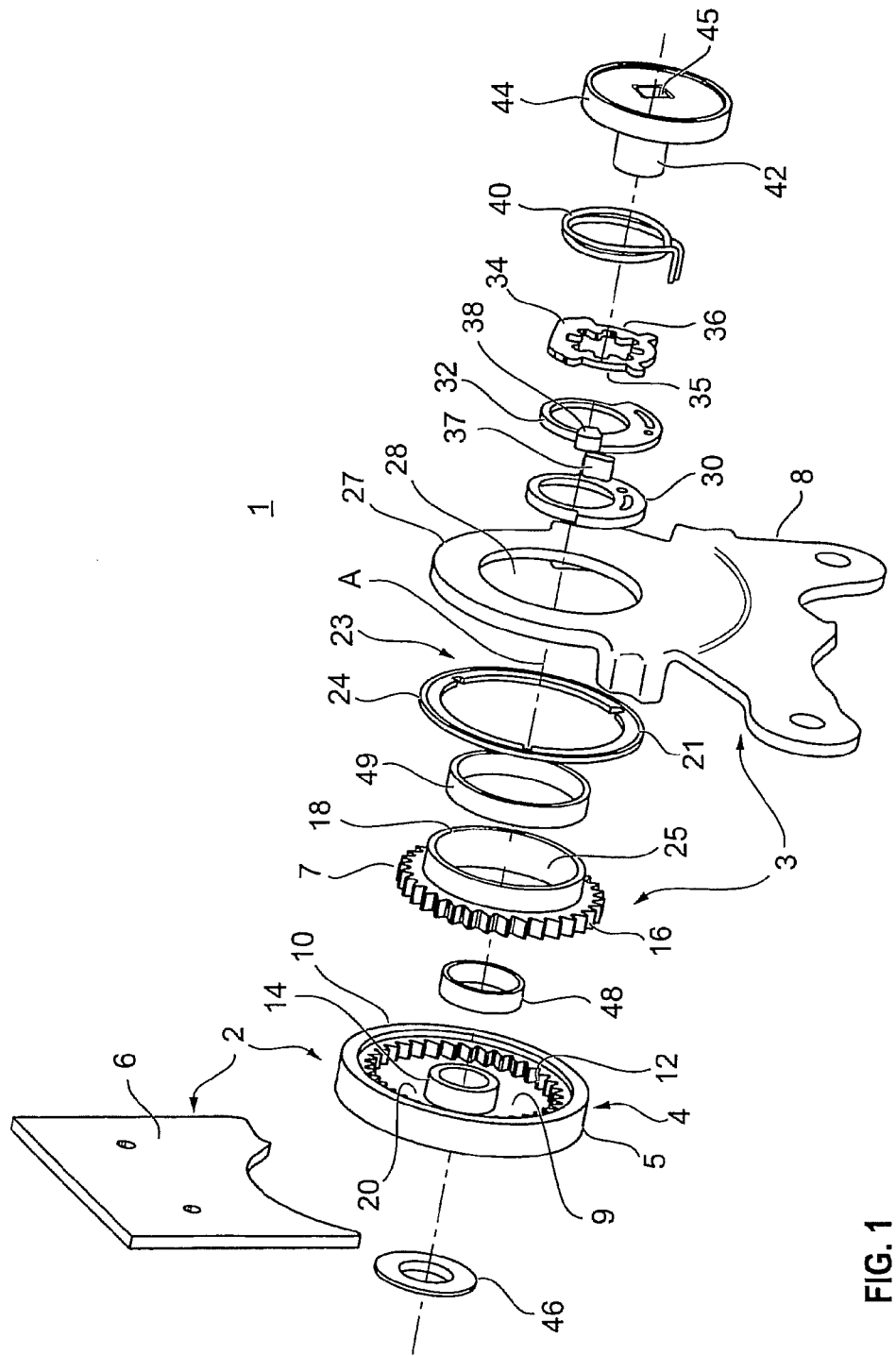
FIG. 1 is an exploded view of an adjustment fitting for a motor vehicle seat, wherein the outer wheel is designed as a ring gear in which the inner wheel is supported by means of a retaining element.

FIG. 1 shows an exploded view of an adjustment fitting 1 for a motor vehicle seat. The adjustment fitting 1 here includes a first fitting part 2 and a second fitting part 3, which are rotationally adjustable relative to one another about an axis of rotation A. The first fitting part 2 has an outer wheel 4, to which is attached, in particular by welding, a suitable backrest adapter 6 for later installation on a seat backrest. The second fitting part 3 includes an inner wheel 7 and a seat adapter 8 connected thereto for attachment to a seat base.

The outer wheel 4 is designed as a ring gear 5 with a floor 9 and a circumferential, cylindrical outer wall 10. Provided on the inside of the outer wall 10 are axially recessed internal teeth 12. The outer wall 10 is extended in the axial direction beyond the internal teeth 12. Also attached in the interior of the ring gear 5 is an elongated collar 14, which surrounds a central bore. Into the ring gear 5 is placed the inner wheel 7, which comprises circumferential external teeth 16 and a cylindrical inner wall 18 that is elongated in the axial direction beyond the external teeth 16.

To assemble the adjustment fitting 1, the inner wheel 7 is placed in the interior space 20 of the ring gear 4. Since the outside diameter of the inner wheel 7 has a reduced diameter as compared to the inside diameter 12 of the ring gear 4, the latter rotates in a wobbling manner with its external teeth 16 rolling on the internal teeth 12 in the ring gear 5. The number of teeth in the external teeth 16 is reduced as compared to the number of teeth in the internal teeth 12, so that in one full circuit the inner wheel 7 rotates relative to the ring gear 5 by the difference in tooth count.

The inner wheel 7 is inserted axially into the ring gear 5 down to the floor 9. A retaining element 23, which is designed as a retaining ring 24, is then guided into the interior space 20 of the ring gear 5 following the inner wheel 7, during which process it encloses the inner wall 18 of the inner wheel 7. The retaining ring 24 has a diameter that is slightly reduced relative to the inside diameter of the outer wall 10. Its inside diameter permits the wobbling motion of the enclosed inner wall 18 of the inserted inner wheel 7. The external teeth 16 of the inner wheel 7 are located on a circumferential flange by which the inner wheel 7 is supported against the retaining ring 24.

The retaining ring 24 is moved toward the floor 9 of the ring gear 5 until a defined axial play of the inner wheel 7 is established. This can take place under the control of either force or distance. In a force-controlled insertion, manufacturing tolerances in the axial width of the external teeth 16 are compensated. At the desired end position, the retaining ring 24 is circumferentially welded to the inner side of the outer wall 10.

As a result of the inner wheel 7 inserted into the ring gear 5, an eccentric receiving space to accommodate a driving eccentric cam is formed between the elongated collar 7 and the inner wall 18.

The seat adapter 8 includes an outer ring 27, which overlaps the inner wall 18 of the inner wheel 7 via a central opening 28. In the assembled state, the inner wall 18 is permanently welded to the outer ring 27 of the seat adapter 8.

A first eccentric cam part 30 and a second eccentric cam part 32 are placed in the eccentric receiving space 25 to form a variable overall eccentricity. These two eccentric cam parts 30, 32, which together form the eccentric cam, are rotated relative to one another by means of a carrier plate 34 placed thereon, by which means their overall eccentricity is varied. To this end, the carrier plate 34 has lateral recesses 35, 36 in which the carrier projections 37, 38 of the first and second eccentric cam parts 30, 32 engage. The eccentric cam parts 30, 32 are preloaded by means of a spring element 40 to form a maximum overall eccentricity, wherein the inner wheel 7 is pressed against the outer wheel 4 without play in this position.

Provided for driving the adjustment fitting 1 is a continuous bearing journal 42, which includes an eccentric cover 44 that laterally engages the inner wall 18. A square opening 45 is introduced into the cover 44 for driving. The bearing journal 42 is joined to the carrier plate 34 in a rotationally fixed manner. To retain the bearing journal 42, a retaining ring 46 is provided on the opposite side.

An inner plain bushing 48 and an outer plain bushing 49 are provided in order to reduce the friction of the eccentric cam parts 30, 32 on the elongated collar 14 and on the inner wall 18. Here, the inner plain bushing 48 is placed on the elongated collar 14. The outer plain bushing 49 is placed in the inner wall 18.

When the bearing journal 42 is actuated, the two eccentric cam parts 30, 32 are moved in opposition to the spring force by the carrier plate 34, reducing the overall eccentricity. This results in play between the inner wheel 7 and the ring gear 5, so that the eccentric cam can be rotated with a wobbling rolling of the inner wheel 7 in the ring gear 5. The fitting parts 2, 3 are displaced relative to one another about the axis of rotation A.

Figure 2:
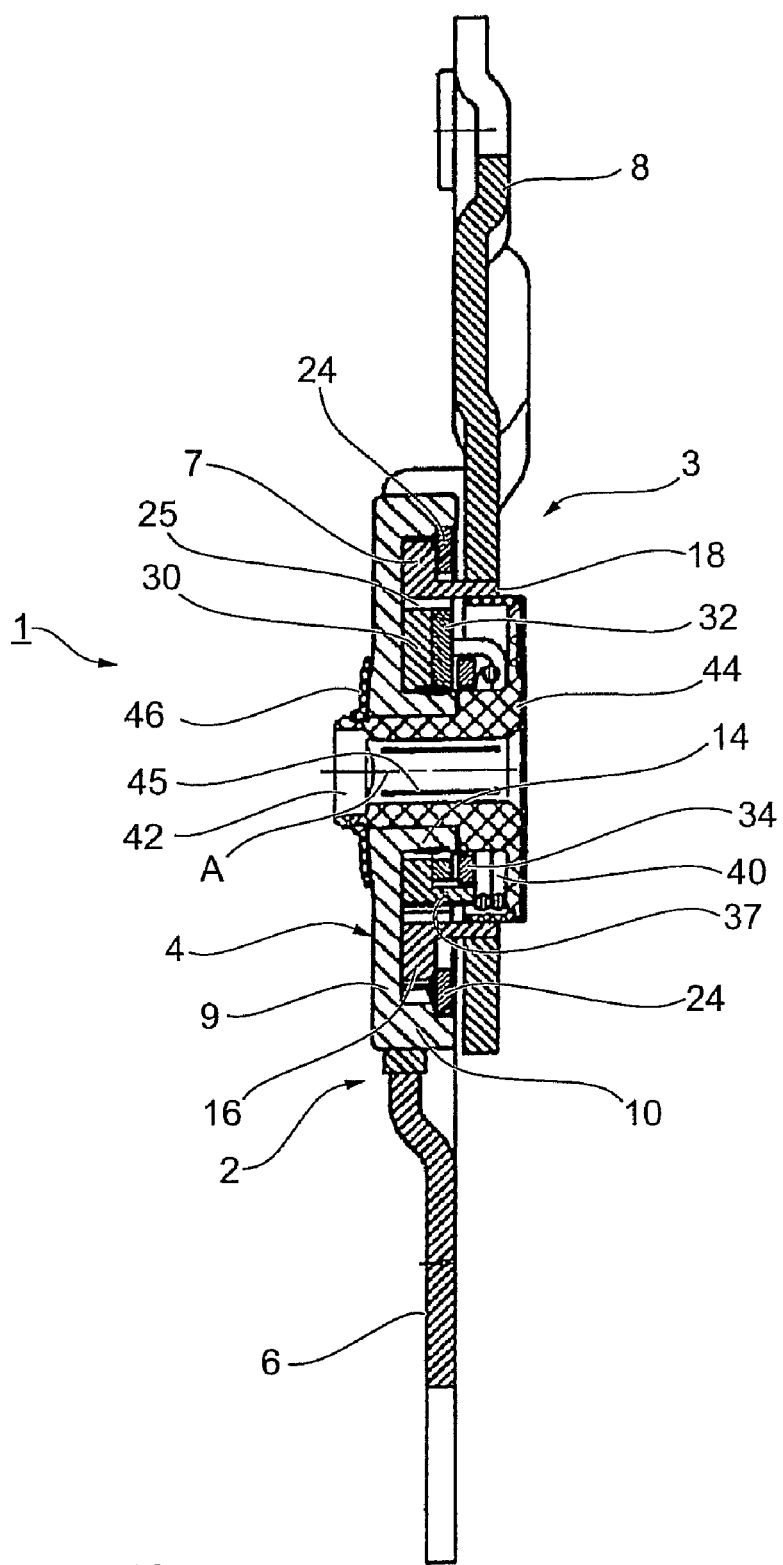
FIG. 2 shows the adjustment fitting from FIG. 1 in a cross-sectional view.

FIG. 2 shows the adjustment fitting 1 from FIG. 1 in cross-section. Evident are the seat adapter 8, which is attached to the inner wheel 7, and the backrest adapter 6, which is rigidly attached to the ring gear 5.

The inner wheel 7 is placed inside the outer wall 10 of the ring gear 4 and is supported between its floor 9 and the retaining ring 24. In this design, the external teeth 16 are supported axially against the retaining ring 24. The axial play of the inner wheel 7 with respect to the ring gear 5 is set by the axial positioning of the retaining ring 24. The retaining ring 24 is welded to the outer wall 10 of the ring gear 5 in the adjusted position. The seat adapter 8 is welded to the outer wall 18 of the inner wheel 7 that is extended in the axial direction beyond the external teeth 16.

The two eccentric cam parts 30 and 32 are placed as an eccentric cam in the eccentric receiving space formed between the elongated collar 14 and the inner wall 18. These eccentric cam parts are preloaded by means of the spring element 40 to form a maximum overall eccentricity. Visible in the cross-section shown is the carrier plate 34, which works together with the carrier projection 37 of the first eccentric cam part 30.

The ring gear 5 is supported on the continuous bearing journal 42 by means of the elongated collar 14. It is evident that the bearing journal 42 is secured on the side of the ring gear 4 by means of the retaining ring 46. On the opposite side, the bearing journal 42 transitions to the cover 44, whose laterally down-turned walls extend into the inner wall 18 of the inner wheel 7. In this design, the cover is likewise of eccentric design corresponding to the overall eccentricity formed by the eccentric cam parts 30, 32. The square hole 45 for attachment to a drive is evident in the interior of the bearing journal.

When the bearing journal 42 is actuated, the overall eccentricity is reduced by means of the carrier plate 34, which moves the eccentric cam parts 30, 32 relative to one another, so that the eccentric cam formed drives the inner wheel to circulate in the ring gear 5. Since the inner wheel 7 is attached to the seat adapter 8 in a stationary manner, the result is a rotation of the backrest adapter 6, and the backrest of the vehicle seat attached thereto, in the same direction as the bearing journal 42.

Figure 3:
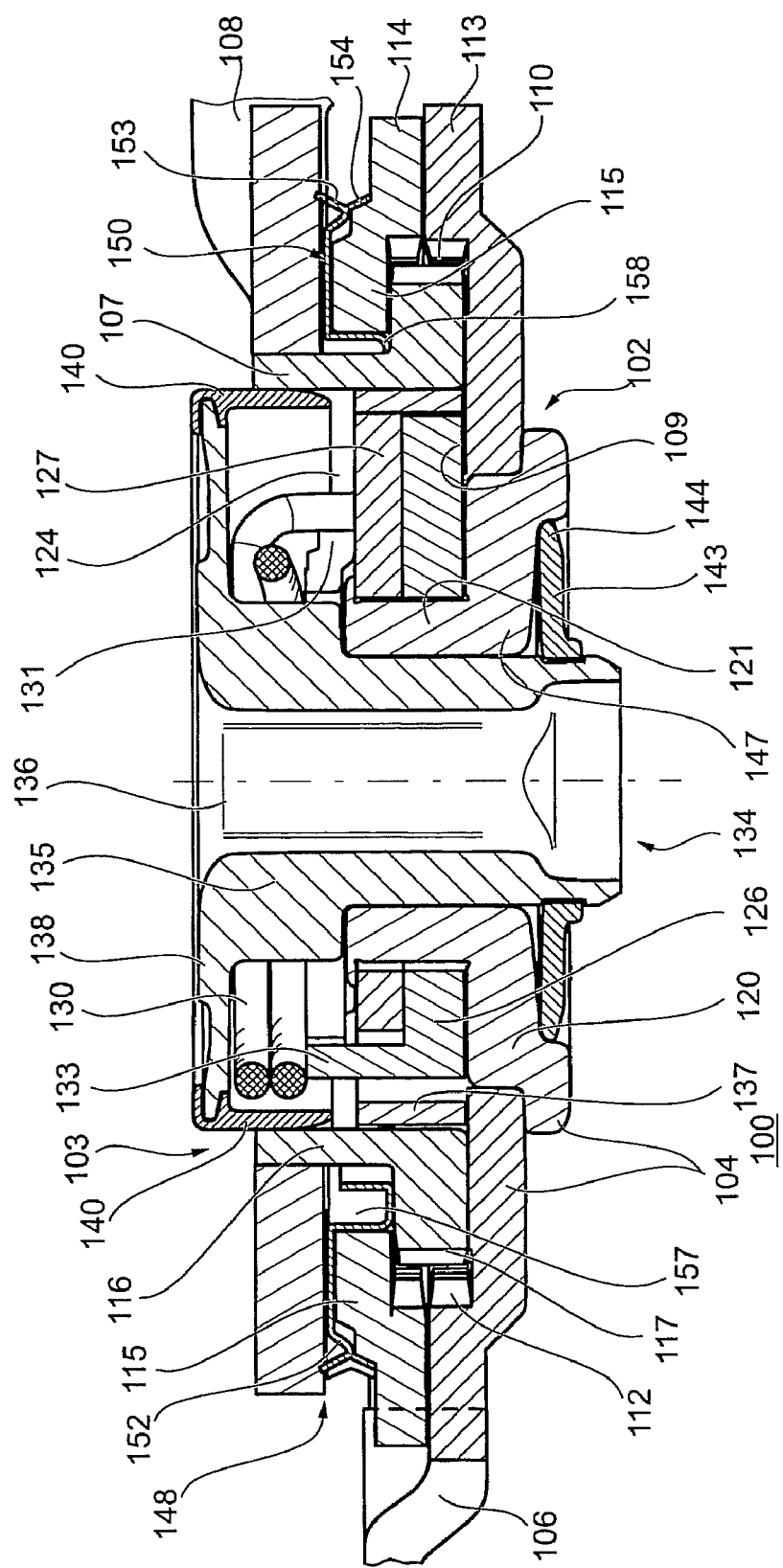
FIG. 3 shows a modified adjustment fitting in a cross-sectional view.

Evident from the cross-sectional view in FIG. 3 is a modified adjustment fitting 100, which comprises a first fitting part 102 and a second fitting part 103, which are rotationally adjustable relative to one another about an axis of rotation.

The first fitting part 102 has an outer wheel 104, which is attached, in particular by means of welding, to a backrest adapter 106 for later installation on a backrest. The second fitting part 103 comprises an inner wheel 107 and a seat adapter 108 fastened thereto for attachment to a seat base.

The outer wheel 104 is designed as a ring gear with a floor 109 and an outer wall 110, wherein internal teeth 112 are placed on the outer wall 110. The outer wheel 104 is divided along the internal teeth 112 and is composed of a first shell 113 and a second shell 114. The second shell overlaps the external teeth 116 of the inner wheel 117, placed on a raised inner wall 116 of the inner wheel 107, with a circumferential collar 115. In this way, the inner wheel 107 is held securely between the first shell 113 and the second shell 114 of the outer wheel 104. In addition, the outer wheel 104 has a separately inserted dome 120, which bears a circumferential elongated collar 121. The design of a separate dome 120 offers the possibility of optimizing the different tribological properties with regard to support and transmission through appropriate selection of materials.

Formed between the elongated collar 121 and the raised inner wall 116 of the inner wheel 107 is an eccentric, annular receiving space 124 in which a first eccentric cam part 126 and a second eccentric cam part 127 are placed for driving the inner wheel 107. Under rotation, the two eccentric cam parts 126, 127 form a variable overall eccentricity and are preloaded by means of a spring element 130 to produce a maximum overall eccentricity. In this preloaded starting position, the external teeth 117 of the inner wheel 107 are pressed against the internal teeth 112 of the outer wheel 104 without play in the direction of maximum eccentricity, so that runout of the fitting parts 102, 103 relative to one another is not possible.

For actuating the eccentric cam parts 126, 127, a carrier plate 131 in which carrier projections 133 of the respective eccentric cam parts 126, 127 engage, is also placed in the eccentric receiving space 124. The carrier plate 131 is attached in a rotationally fixed manner to the central drive shaft 134, which in the present case is designed as a continuous bearing journal 135. When the bearing journal 135 is driven or rotated, the eccentric cam parts 126, 127 are rotated against the preloading of the spring element 130 via the carrier plate 131 attached in a rotationally fixed manner, so that the inner wheel 107 now rests against the outer wheel 104 with play. The overall eccentric cam composed of the eccentric cam parts 126, 127 can be rotated, with the external teeth 117 of the inner wheel 107 rolling on the internal teeth 112 of the outer wheel 104. One full rotation of the eccentric cam results in a rotation of the inner wheel 107 relative to the outer wheel 104 corresponding to a difference in tooth count between the external teeth 117 and the internal teeth 112.

In order to drive the bearing journal 135, the journal has a square opening 136 on its top side. Provided on the opposite side is a receptacle for a further shaft which is provided for driving a corresponding adjustment fitting on the other side of the vehicle seat if desired.

To reduce the friction between the eccentric cam parts 126, 127 and the inner wheel 107, a plain bushing 137 is placed in the inner circumference of the inner wheel 107.

The bearing journal 135 is designed as a single piece with a cap 138, which seals the eccentric receiving space 124 with respect to the outside. The cap 138 is designed in the shape of a disk and is offset radially with respect to the drive shaft 134. In other words, the cap 138 is eccentric in design. The eccentric cap 138 additionally includes a sealing rim 140 that is drawn axially downward, which projects inside the eccentric receiving space 124. By means of preloading directed radially outward toward the inner wall 116 of the inner wheel 107, the circumferential sealing rim 140 seals the eccentric receiving space 124 with respect to the outside. The sealing rim 140 is made of a moldable elastomer, and is molded onto the bearing journal 135 by means of a two-component injection molding process. It can be seen that the axial length of the sealing rim 140 is dimensioned such that different variants of the adjustment fitting 100, which differ in axial height, can be sealed with one and the same bearing journal 135. In particular, manufacturing tolerances are compensated by this means as well. An axial offset of the sealing rim 140 with respect to the inner wall 116 within a certain limit does not change the sealing function.

On the side facing away from the cap 138, the bearing journal 35 is held on the adjustment fitting 100 by means of a locking disk 143. The fitting parts 102, 103 are axially held together by the outer wheel 104 implemented as a ring gear. The locking disk 143 has a circumferential sealing rim 144, and is held in a saucer-shaped recess 147 of the floor 109 or of the separate dome 120. Axial preloading of the sealing rim 144 with respect to the floor 109 is achieved by means of a clip attachment of the locking disk 143 to the bearing journal 135. As a result, not only does the locking disk 143 hold the bearing journal 135 in the adjustment fitting 100, it also seals the radial gap between the bearing journal 135 and the dome 120. On this side, too, penetration of dirt and, in particular, penetration of paint during the painting process, is thus reliably prevented. The sealing and securing functions can also be implemented here by two separate components. For example, the sealing rim 144 can also be implemented as a separate sealing ring on the locking disk 143.

The seat adapter 108, in the form of a seat adapter plate, is attached circumferentially, in particular welded, to the inner wall 116 of the inner wheel 107. The backrest adapter 106 is spaced axially away from the outer wheel 104 in order to permit rotation relative to one another. In addition, a disk-shaped central seal 150 is placed in the resultant axial gap 148 between the seat adapter 108 and the outer wheel 104. In this way, the interior of the adjustment fitting 100 is fully sealed with respect to the outside. Neither dirt nor paint can enter the internal transmission parts through the outer annular gap between the inner wheel 107 and the outer wheel 104, as well.

The disk-shaped central seal 150 additionally has an outer sealing rim 152 with an essentially Y-shaped cross-section. Here, the two legs 153, 154 of the outer sealing rim 152 extend radially outward and spread axially against the seat adapter 108 and against the outer wheel 104. In this way, dirt and, in particular, paint, is reliably prevented from penetrating the interior space of the adjustment fitting 100 through the axial gap 148.

In addition, the central seal 150 has an inner axial sealing rim 157 with which it is placed in the collar 115 of the outer wheel 104. The inner sealing rim 157 has an inwardly curved end 158. By this means, the internal transmission of the adjustment fitting 100 is protected from welding spatter during the manufacturing process.

Figure 4:
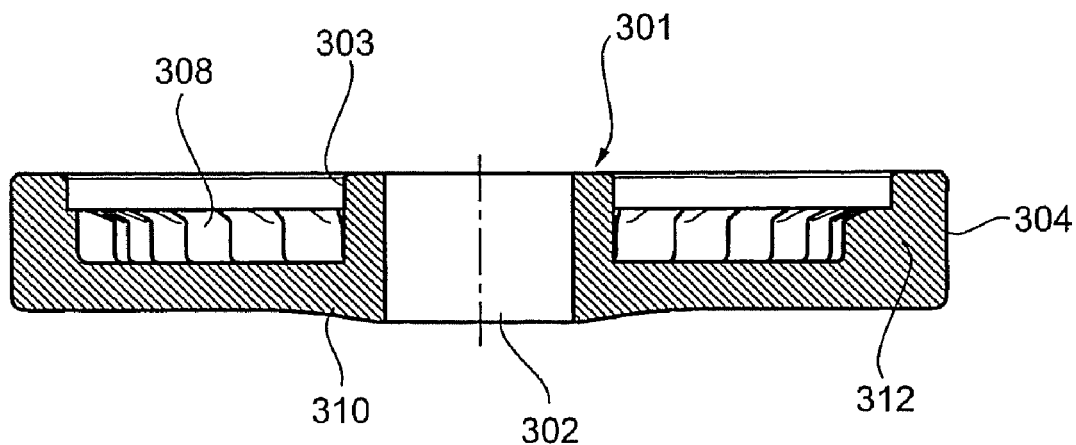
FIG. 4 shows a cross-sectional view of an outer wheel produced by cold extrusion.

FIG. 4 shows a cross-section of an outer wheel 301 fabricated by cold extrusion. Visible are the elongated collar 303 surrounding a central bore 302, and the raised outer wall 304 on whose inner circumference internal teeth 308 are formed. By means of cold extrusion, the material thickness of the outer wheel 301 is increased in the region 310 toward the elongated collar 303 and in the tooth region 312. In this regard, the outer wheel 301 fabricated by cold extrusion has a distribution of material appropriate to loading.

Figure 5:
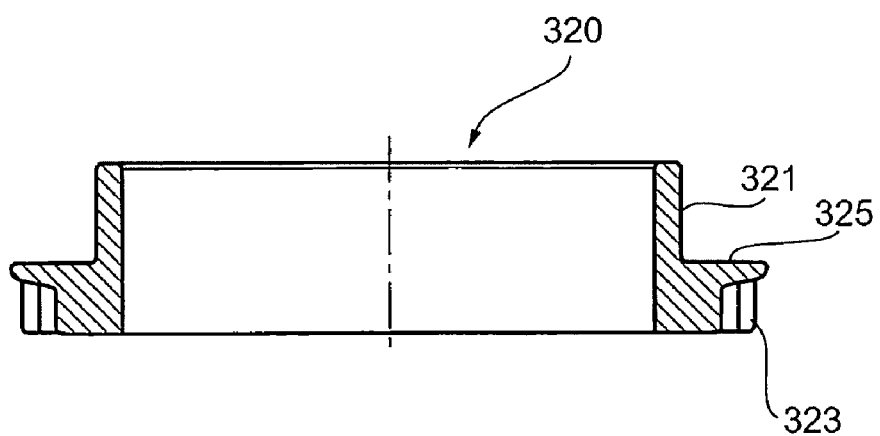
FIG. 5 shows a cross-sectional view of an inner wheel produced by cold extrusion.

FIG. 5 shows a cross-section of a cold-extruded inner wheel 320. The raised inner wall 321, which carries external teeth 323 on its outer side, is evident. The external teeth 323 are circumferentially attached to a support geometry through a ring 325 located thereon. The strength of the inner wheel 320 is thus increased for the same assembled volume. Moreover, provision of the ring 325 achieves good material flow for forming of the external teeth 323 during cold extrusion.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An adjustment fitting for a motor vehicle seat, the fitting comprising:
    a first fitting part;
    a second fitting part that is configured to be rotationally adjustable relative to the first fitting part about an axis of rotation,
    an outer wheel associated with the first fitting part, the outer wheel having internal teeth;
    an inner wheel configured to be inserted eccentrically to the axis of rotation,. in a manner of a wobble mechanism, the inner wheel having external teeth that are associated with the second fitting part, the inner wheel forming a receiving space that is eccentric to the axis of rotation;
    an eccentric cam configured to be rotatably inserted in the eccentric receiving space; and
    a drive shaft configured to drive the eccentric cam,
    wherein the outer wheel is configured as a ring gear with a floor and with an outer wall that extends in an axial direction past the internal teeth and that overlaps the external teeth of the inner wheel with a radially inward facing collar, and
    wherein the inner wheel includes an inner wall that extends in the axial direction past the external teeth and that passes through the collar in the axial direction.

2. The adjustment fitting according to claim 1, wherein the inner wheel engages a seat adapter via the inner wall to form the second fitting part.

3. The adjustment fitting according to claim 1, wherein the ring gear is divided along the internal teeth and is composed of a first and a second shell, wherein the second shell overlaps the external teeth of the inner wheel as a collar.

4. The adjustment fitting according to claim 1, wherein the collar is composed of a retaining element that is configured to be pushed axially in the outer wall toward the inner wheel, the retaining element being attached to the outer wall and supporting the inner wheel against the floor of the ring gear.

5. The adjustment fitting according to claim 4, wherein the retaining element is welded to the outer wall of the ring gear.

6. The adjustment fitting according to claim 4, wherein the retaining element is configured as a retaining ring.

7. The adjustment fitting according to claim 1, wherein the outer wall of the ring gear and the inner wall of the inner wheel are each configured as a cylinder wall.

8. The adjustment fitting according to claim 1, wherein an elongated collar is formed on the floor of the ring gear, so that the eccentric receiving space is formed between the elongated collar and the inner wheel.

9. The adjustment fitting according to claim 1, wherein the eccentric cam in the eccentric receiving space is supported between an inner plain bushing and an outer plain bushing.

10. The adjustment fitting according to claim 1, wherein two mutually rotatable eccentric cam parts form a variable overall eccentricity and are placed in the receiving space and are preloaded against one another to form a maximum overall eccentricity, and wherein a carrier that is attached to the drive shaft in a rotationally fixed manner is provided that acts on the eccentric cam parts in opposition to the preloading when driven.

11. The adjustment fitting according to claim 1, wherein the drive shaft is configured as a continuous bearing journal.

12. The adjustment fitting according to claim 1, wherein the first fitting part or the ring gear is attached or welded to a backrest adapter, and wherein the second fitting part or the inner wheel is attached or welded to a seat adapter.

13. The adjustment fitting according to claim 1, wherein the external teeth of the inner wall of the inner wheel are covered by a circumferential ring.

14. The adjustment fitting according to claim 1, wherein the inner wheel with the inner wall and all external teeth is fabricated as a cold extrusion part.

15. The adjustment fitting according to claim 1, wherein the outer wheel is fabricated as a cold extrusion part.

* * * * *